(12) United States Patent
Jaroszczyk et al.

(10) Patent No.: US 6,375,700 B1
(45) Date of Patent: Apr. 23, 2002

(54) DIRECT FLOW FILTER

(75) Inventors: Tadeusz Jaroszczyk; Douglas K. Benham; Scott P. Heckel; Michael J. Connor, all of Stoughton; Stephen L. Fallon, Madison; Jeffrey S. Morgan, Stoughton; Z. Gerald Liu, Madison, all of WI (US)

(73) Assignee: Nelson Industries, Inc., Stoughton, WI (US)

( * ) Notice: Subject to any disclaimer, the term of this patent is extended or adjusted under 35 U.S.C. 154(b) by 0 days.

(21) Appl. No.: 09/600,000

(22) Filed: Jun. 23, 2000

(51) Int. Cl.⁷ .............................................. F02M 35/00
(52) U.S. Cl. ............................ 55/498; 55/502; 55/521; 210/493.2; 210/493.5
(58) Field of Search ...................... 55/527, 528, 488, 55/498, 510, 521, 502, DIG. 30, 500, 524; 210/493.1, 493.2, 497.3, 506, 493.5

(56) References Cited

U.S. PATENT DOCUMENTS

| | | |
|---|---|---|
| 2,210,397 A | 8/1940 | Dreiss |
| 2,397,759 A | 4/1946 | Sigmund |
| 2,599,604 A | 6/1952 | Bauer et al. |
| 3,025,964 A | 3/1962 | Summers et al. |
| 3,112,184 A | 11/1963 | Hollenbach |
| 3,397,518 A | 8/1968 | Rogers |
| 3,401,803 A | 9/1968 | Bub |
| 3,722,696 A | 3/1973 | Dwyer et al. |
| 3,739,916 A | 6/1973 | Cub et al. |
| 3,871,851 A | 3/1975 | Neumann |
| 4,181,513 A * | 1/1980 | Fukuda et al. ............... 55/527 |
| 4,219,420 A * | 8/1980 | Muller ........................ 55/527 |
| 4,310,419 A | 1/1982 | Nara et al. |
| 4,419,108 A | 12/1983 | Frost et al. |
| 4,441,899 A | 4/1984 | Takagi et al. |
| 4,589,983 A * | 5/1986 | Wydevan ..................... 55/498 |
| 4,640,779 A | 2/1987 | Taki et al. |
| 4,652,286 A | 3/1987 | Kusuda et al. |
| 4,685,944 A | 8/1987 | Allan et al. |
| 4,710,297 A | 12/1987 | Suzuki et al. |
| 4,725,411 A * | 2/1988 | Cornelison ................... 55/527 |
| 4,826,517 A | 5/1989 | Norman |
| 4,885,015 A | 12/1989 | Goulet et al. |
| 4,925,561 A | 5/1990 | Ishii et al. |
| 4,929,263 A | 5/1990 | Kasugai |

(List continued on next page.)

Primary Examiner—David A. Simmons
Assistant Examiner—Minh-Chau T. Pham
(74) Attorney, Agent, or Firm—Andrus, Sceales, Starke & Sawall, LLP

(57) ABSTRACT

A filter (10, 10a) includes a housing (12, 12a) extending along an axis (14). and having an inlet (16, 16a) at one axial end (18, 18a) of the housing and having an outlet (20, 20a) at a distally opposite axial end (22, 22a) of the housing. One or more pleated filter elements (44, 44a, 44b, 44c, 44d) in the housing are pleated along a plurality of bend lines (46, 48) extending axially. The filter element has a plurality of wall segments (50) extending in serpentine manner between the bend lines. The wall segments extend axially between upstream ends (52) and downstream ends (54) and define axial flow channels (58, 62) therebetween. The upstream ends of the wall segments are alternately sealed (56) to each other to defme a first set of flow channels (58) having open upstream ends (60), and a second set of flow channels (62) interdigitated with the first set of flow channels and having closed upstream ends (64). The downstream ends of the wall segments are alternately sealed to each other (66) such that the first set of flow channels have closed downstream ends (68), and the second set of flow channels have open downstream ends (70). Fluid to be filtered flows substantially directly axially through the filter element (44) or elements (44a, 44b, 44c, 44d), through the open upstream ends of the first set of flow channels then through the wall segments then through the open downstream ends of the second set of flow channels. A gasket (82, 82a, 82b, 82c) seals the filter element to the housing.

25 Claims, 7 Drawing Sheets

U.S. PATENT DOCUMENTS

| | | |
|---|---|---|
| 5,049,274 A | 9/1991 | Leason et al. |
| 5,298,046 A | 3/1994 | Peisert |
| 5,322,537 A | 6/1994 | Nakamura et al. |
| 5,376,270 A | 12/1994 | Spearman |
| 5,494,497 A | 2/1996 | Lee |
| 5,512,172 A | 4/1996 | Marble |
| 5,525,136 A | 6/1996 | Rosen |
| 5,562,825 A | 10/1996 | Yamada et al. |
| 5,618,324 A | 4/1997 | Sommer et al. |
| 5,620,505 A | 4/1997 | Koch et al. |
| 5,674,302 A | 10/1997 | Nakayama et al. |
| 5,679,122 A | 10/1997 | Moll et al. |
| D396,098 S | 7/1998 | Gillingham et al. |
| 5,779,747 A | 7/1998 | Schlor et al. |
| 5,792,228 A | 8/1998 | Fath et al. |
| 5,795,361 A | 8/1998 | Lanier, Jr. et al. |
| 5,814,219 A * | 9/1998 | Friedmann et al. ............ 55/498 |
| D399,944 S | 10/1998 | Gillingham et al. |
| 5,820,646 A | 10/1998 | Gillingham et al. |
| 5,830,414 A * | 11/1998 | Ishii et al. ..................... 55/527 |
| 5,851,249 A * | 12/1998 | Henda et al. .................. 55/498 |
| 5,902,364 A | 5/1999 | Tokar et al. |
| 5,958,097 A | 9/1999 | Schlor et al. |
| 6,165,244 A * | 12/2000 | Choi ........................... 55/527 |

\* cited by examiner

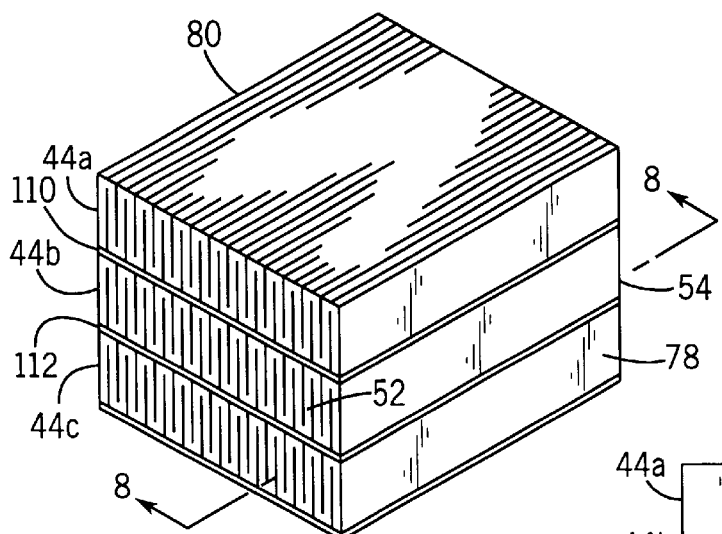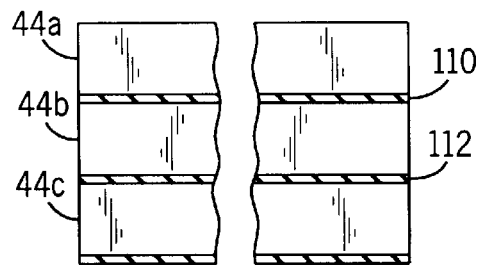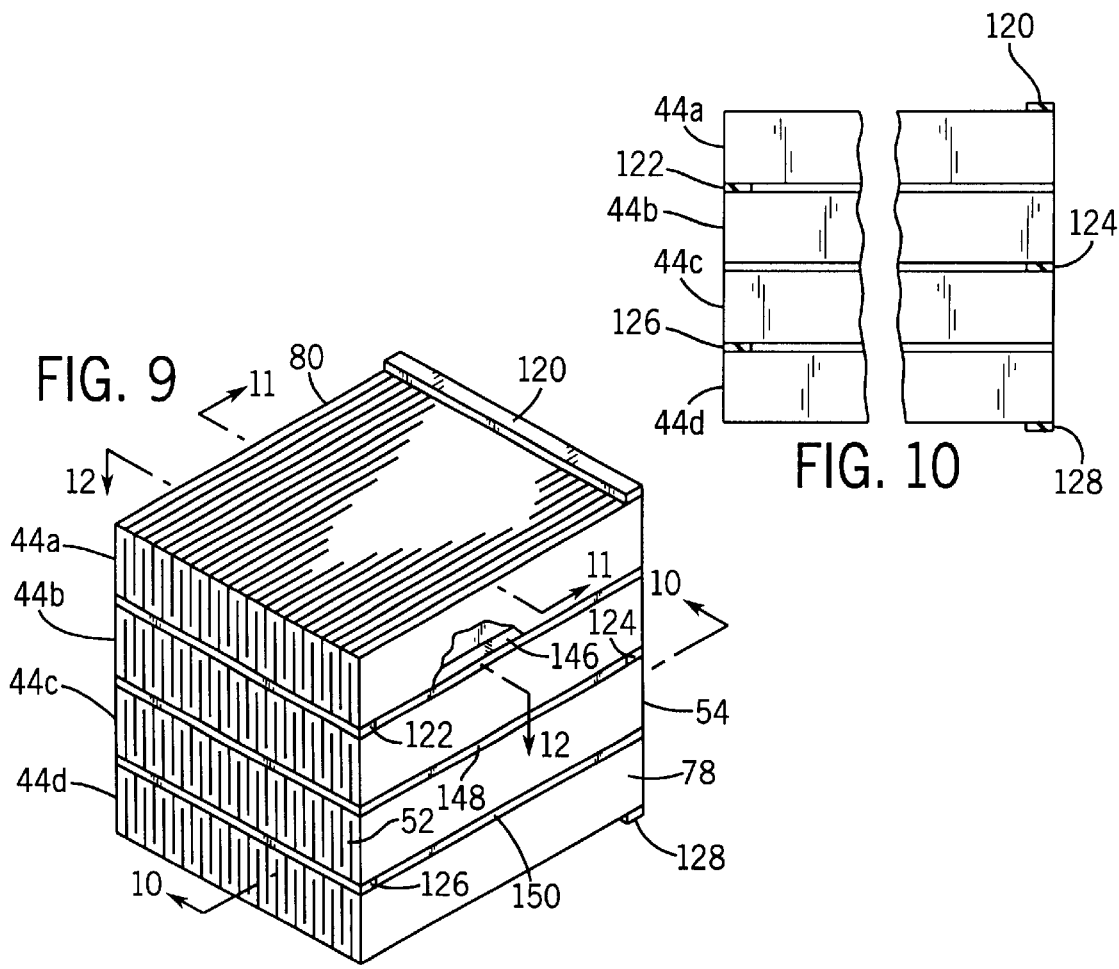

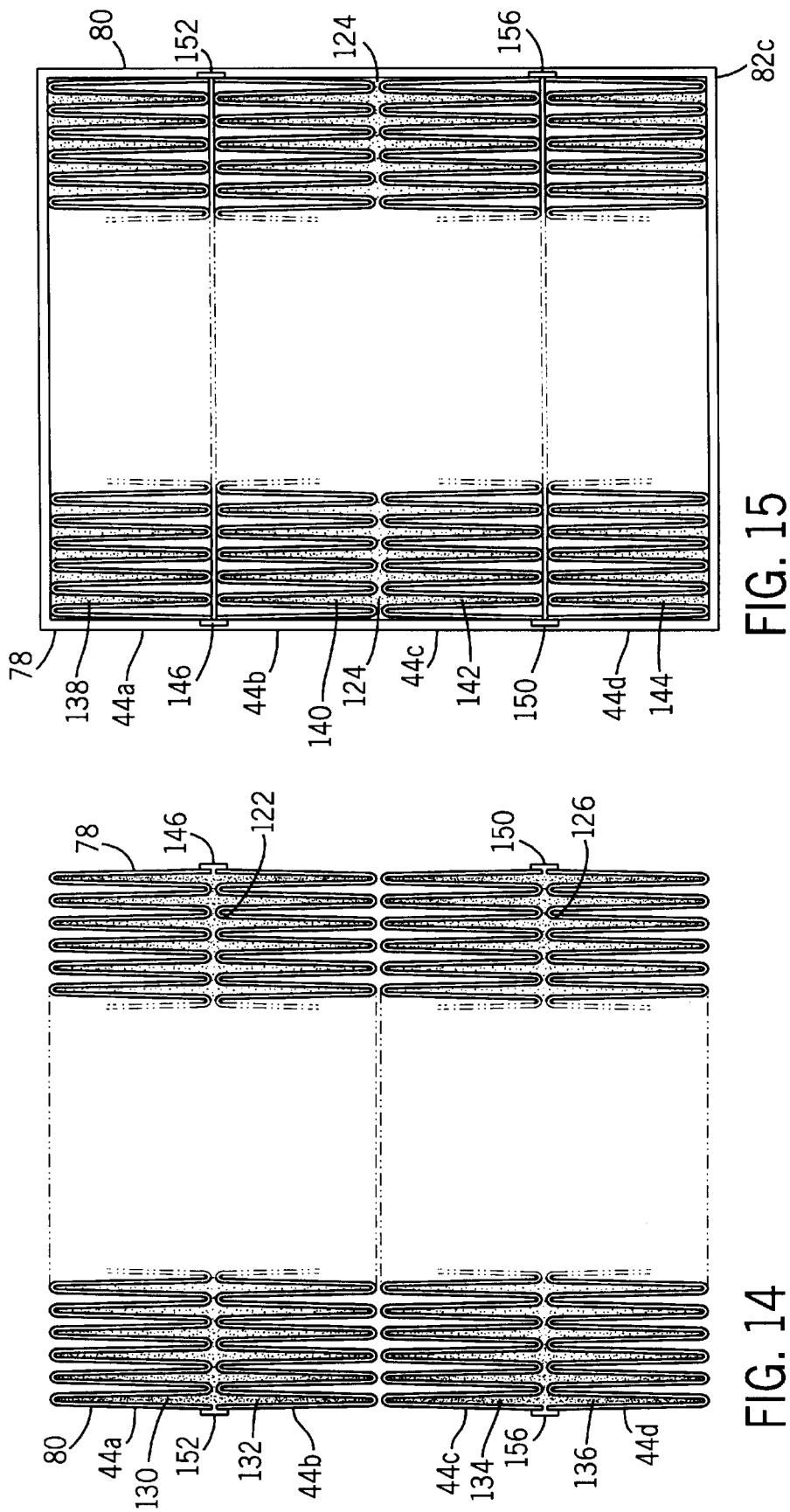

DIRECT FLOW FILTER

BACKGROUND AND SUMMARY

The invention relates to fluid filters, including panel type air cleaners.

It is known in the prior art to use pleated filter blocks for various fluid filtering applications, including panel type air cleaners. The present invention arose during development efforts directed toward improving space efficiency, capacity, and performance, i.e. reduced pressure drop, of classical panel air filters.

The present invention provides a direct substantially straight-through flow filter. The elimination of directional changes in flow reduces flow resistance and pressure drop, improving filtration performance and enabling higher flow rates. The invention also enables more efficient space utilization, i.e. eliminating large open areas within the filter housing between the filter element and the housing, which is particularly desirable in space constrained areas such as behind the cabin or under the hood of vehicles.

BRIEF DESCRIPTION OF THE DRAWINGS

FIG. 7 is similar to FIG. 6 and illustrates sealing between elements.

FIG. 8 is a sectional view taken along line 8—8 of FIG. 7.

FIG. 9 is like FIG. 7 and shows another embodiment.

FIG. 10 is a sectional view taken along line 10—10 of FIG. 9.

FIG. 14 is an elevational view of the front or upstream side of the filter of FIG. 13.

FIG. 15 is an elevational view of the back or downstream side of the filter of FIG. 13.

DETAILED DESCRIPTION OF THE INVENTION

Figure 1:
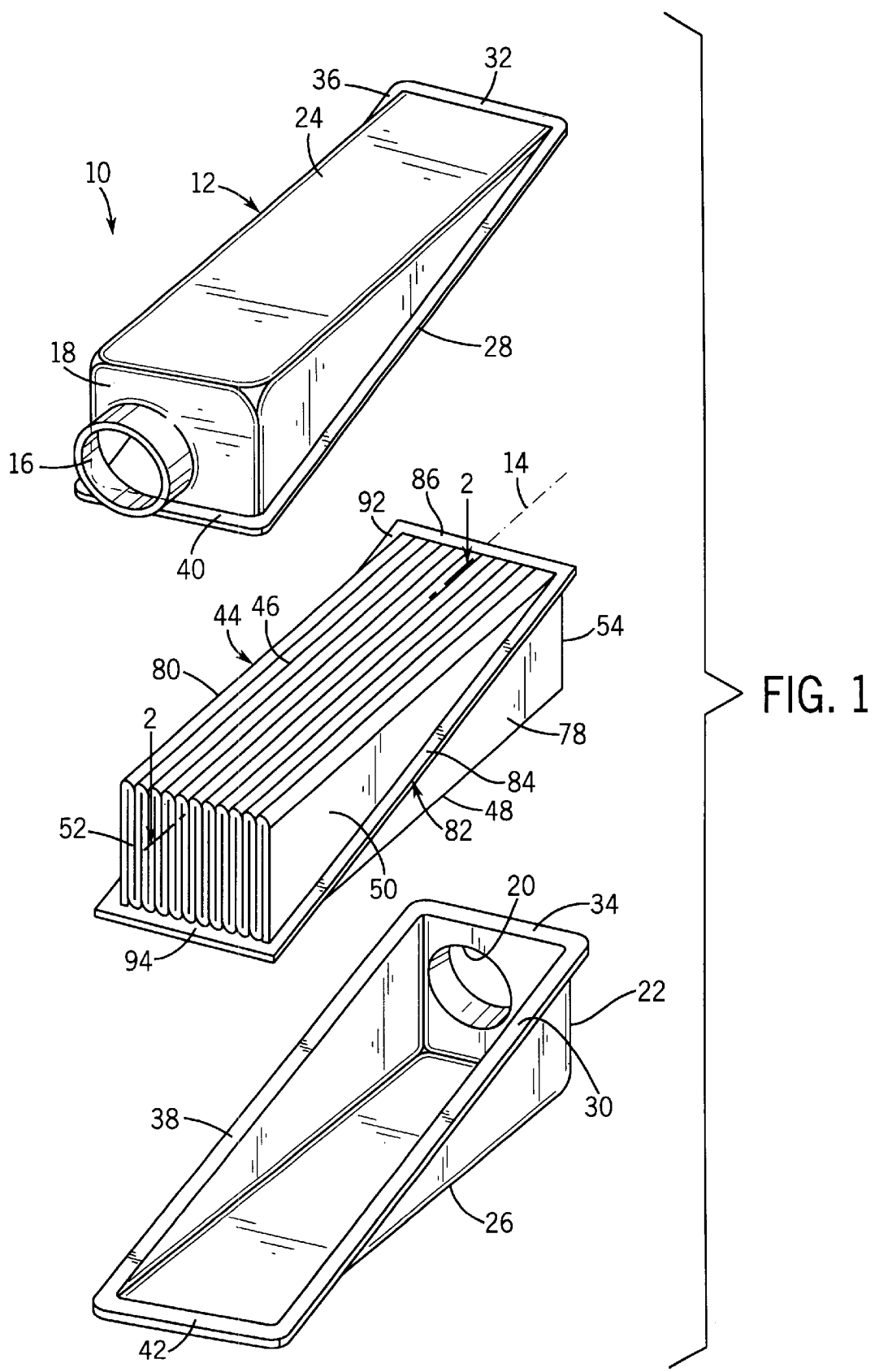
FIG. 1 is an exploded perspective view of a filter constructed in accordance with the invention.

FIG. 1 shows a filter 10 including a housing 12 extending axially along axis 14 and having an inlet 16 at one axial end 18 of the housing and having an outlet 20 at a distally opposite axial end 22 of the housing. The housing is preferably plastic and provided by identical upper and lower half sections 24 and 26 mating along diagonal flanges 28, 30, lateral flanges 32, 34, diagonal flanges 36, 38, and lateral flanges 40, 42.

A pleated filter block is provided by pleated filter element 44 in the housing. The pleated filter element is pleated along a plurality of upper bend lines 46 and lower bend lines 48, which bend lines extend axially. The filter element has a plurality of wall segments 50 extending in serpentine manner between the upper and lower bend lines. The wall segments extend axially between upstream ends 52 at inlet 16, and downstream ends 54 at outlet 20. The wall segments define axial flow channels 55 therebetween, FIG. 2. The upstream ends of the wall segments are alternately sealed to each other, as shown at 56 in FIG. 2, to define a first set of flow channels 58 having open upstream ends 60, and a second set of flow channels 62 interdigitated with the first set of flow channels 58 and having closed upstream ends 64. The downstream ends 54 of wall segments 50 are alternately sealed to each other, as shown at 66 in FIG. 2, such that the first set of flow channels 58 have closed downstream ends 68, and the second set of flow channels 62 have open downstream ends 70. Fluid to be filtered, such as air, flows substantially directly axially through filter element 44, namely from inlet 16 through open upstream ends 60 of the first set of flow channels 58 as shown at arrows 72, then through wall segments 50 as shown at arrows 74, then through open downstream ends 70 of the second set of flow channels 62 as shown at arrows 76, then to outlet 20. It is preferred that at least a portion of each of inlet 16 and outlet 20 are axially aligned.

Filter element 44 has laterally distally opposite right and left axially extending sides 78 and 80, FIG. 1, defining first and second axially extending planes. The second axial plane at side 80 is parallel to and spaced from the first axial plane at side 78. Upper bend lines 46 provide a first or upper set of coplanar bend lines defining a third axially extending plane. Lower bend lines 48 define a lower or second set of coplanar bend lines defining a fourth axially extending plane. The fourth axial plane at lower bend lines 48 is parallel to and spaced from the third axial plane at upper bend lines 46. The third and fourth axial planes are perpendicular to the noted first and second axial planes. Upstream ends 52 of wall segments 50 define a first laterally extending plane, and downstream ends 54 of the wall segments define a second laterally extending plane. The second lateral plane at downstream ends 54 is parallel to and spaced from the first lateral plan e at upstream ends 52. The noted first and second lateral planes are perpendicular to the noted first and second axial planes and perpendicular to the noted third and fourth axial planes.

Figure 3:
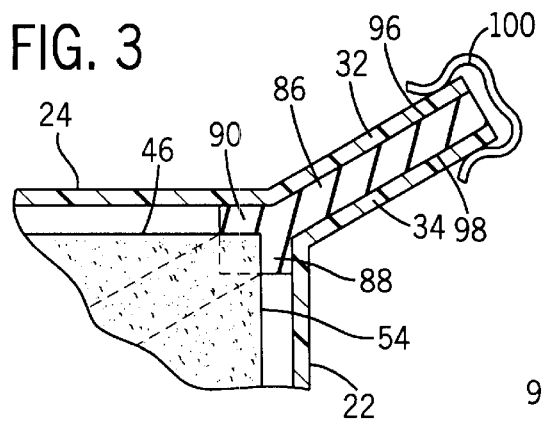
FIG. 3 is a sectional view of a portion of the filter of FIG. 1 in assembled condition.
Figure 2:
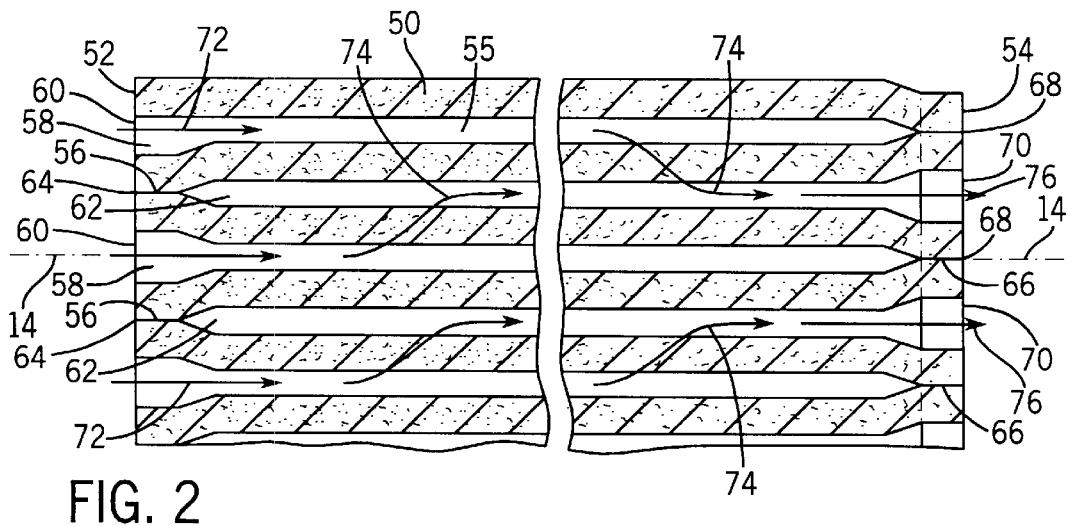
FIG. 2 is a sectional view taken along line 2—2 of FIG. 1.

A gasket 82, FIGS. 1, 3, is provided for sealing filter 44 to housing 12, such that air entering inlet 16 cannot bypass the filter element to outlet 20, and instead must flow through the filter element as shown at arrows 72, 74, 76, FIG. 2. Gasket 82 has a first section 84 extending along the noted first axial plane along right side 78. Gasket 82 has a second section 86 extending along the noted second lateral plane at downstream ends 54 as shown at 88 in FIG. 3, and also extending along the noted third axial plane at upper bend lines 46, as shown at 90 in FIG. 3. In alternate embodiments, second section 86 of gasket 82 extends along only one or the other of the noted second lateral plane at 88 or third axial plane at 90, but not both. Gasket 82 has a third section 92 extending along the noted second axial plane along left side 80. Gasket 82 has a fourth section 94 extending along the noted first lateral plane at upstream ends 52 of wall segments 50, and also extending along the noted fourth axial plane at lower bend lines 48, comparably to FIG. 3. In alternate embodiments, fourth section 94 of gasket 82 extends along only one or the other of the noted first lateral plane and fourth axial plane, but not both. Gasket 82 is preferably adhesively secured to filter element 44 along each of the noted gasket sections 84, 86, 92, 94, such that filter element 44 and gasket 82 are replaced as a modular unit. It is further preferred that the upper and lower surfaces of the gasket, such as 96 and 98, FIG. 3, be pinched and compressed between respective housing flanges such as 32 and 34, with such outer peripheral sandwich arrangement being held in assembled condition by any suitable means, such as clip 100, clamps, bolts, or the like. In alternate embodiments, other surfaces of the gasket may be used as the sealing surface against the housing. First and third gasket sections 84 and 92 extend obliquely relative to axis 14. Second and fourth gasket sections 86 and 94 extend perpendicularly to the noted first and second axial planes. Second and fourth gasket sections 86 and 94 are axially spaced, and first and third gasket sections 84 and 92 extend diagonally between second and fourth gasket sections 86 and 94.

Figure 4:
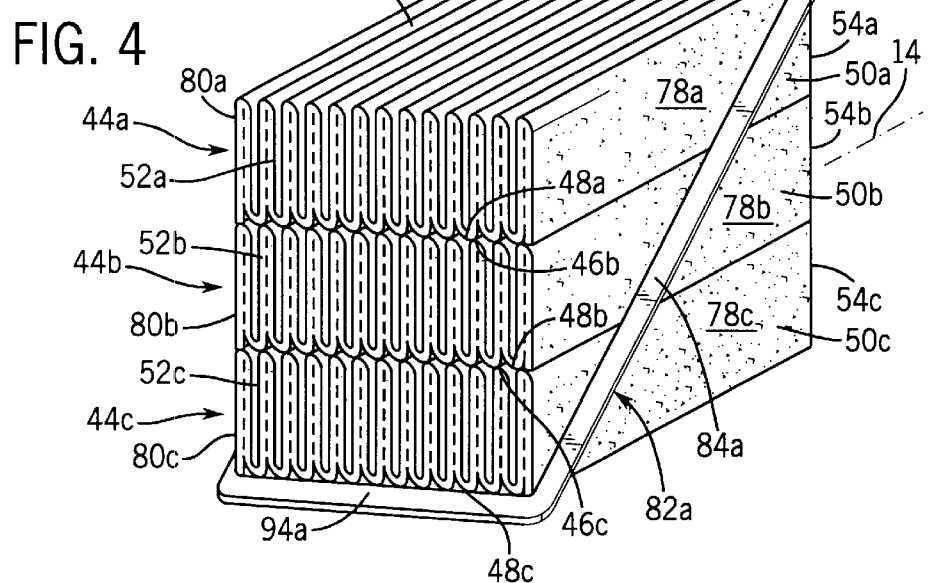
FIG. 4 is a perspective view similar to a portion of FIG. 1 and shows an alternate embodiment.

FIG. 4 shows a further embodiment having a plurality of filter elements 44a, 44b, 44c stacked on each other. The filter elements have respective wall segments 50a, 50b, 50c with upstream ends 52a, 52b, 52c and downstream ends 54a, 54b, 54c. Upstream ends 52a, 52b, 52c of the wall segments are coplanar along a first laterally extending plane. Downstream ends 54a, 54b, 54c are coplanar along a second laterally extending plane. The second lateral plane is parallel to and spaced from the first lateral plane. The filter elements have respective laterally distally opposite right and left sides 78a and 80a, 78b and 80b, 78c and 80c. Right sides 78a, 78b, 78c are coplanar along a first axially extending plane. Left sides 80a, 80b, 80c are coplanar along a second axially extending plane. The second axial plane is parallel to and spaced from the first axial plane. The filter elements 44a, 44b, 44c have respective upper sets of coplanar bend lines 46a, 46b, 46c, and lower sets of coplanar bend lines 48a, 48b, 48c. The upper set of coplanar bend lines 46a of top filter 44a defines a third axially extending plane. The lower set of coplanar bend lines 48c of the bottom filter element 44c defines a fourth axially extending plane. The fourth axial plane is parallel to and spaced from the third axial plane. The third and fourth axial planes are perpendicular to the first and second axial planes. The noted first and second lateral planes are perpendicular to the noted first and second axial planes and perpendicular to the noted third and fourth axial planes. Gasket 82a has a first section 84a extending along the noted first axial plane along right sides 78a, 78b, 78c. Gasket 82a has a second section 86a extending along the noted second lateral plane along downstream ends 54a, and also along the noted third axial plane along upper bend lines 46a. In alternate embodiments, gasket section 86a extends along only one or the other of the noted second lateral plane along downstream ends 54a or along the noted third axial plane along upper bend lines 46a, but not both. Gasket 82a has a third section 92a extending along the noted second axial plane along left sides 80a, 80b, 80c. Gasket 82a has a fourth section 94a extending along the noted first lateral plane along upstream ends 52a, 52b, 52c, and also extending along the noted fourth axial plane along lower bend lines 48c. In alternate embodiments, gasket section 94a extends along only one of the noted first lateral plane along upstream ends 52a, 52b, 52c or the noted fourth axial plane along lower bend lines 48c, but not both. The construction in FIG. 4 provides a pleated filter block having one or more rows of wall segments 50a, 50b, 50c folded in serpentine manner between respective bend lines, and providing filtered fluid flow substantially directly axially through the filter block along axis 14. First and third gasket sections 84a and 92a extend obliquely relative to axis 14. Second and fourth gasket sections 86a and 94a extend perpendicular to the noted first and second axial planes. Second and fourth gasket sections 86a and 94a are axially spaced, and first and third gasket sections 84a and 92a extend diagonally between second and fourth gasket sections 86a and 94a.

Figure 5:
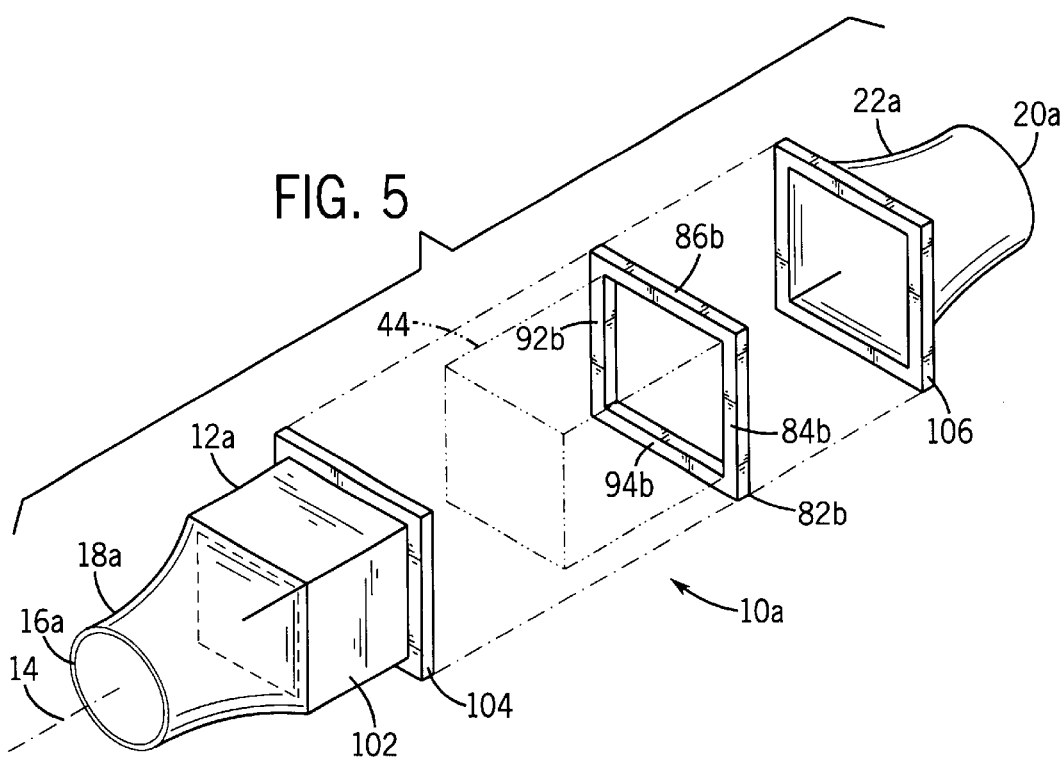
FIG. 5 is an exploded perspective view of an alternate embodiment.

FIG. 5 shows a further embodiment, and uses like reference numerals from above where appropriate to facilitate understanding. Filter 10a includes a housing 12a extending axially along axis 14 and having an inlet 16a at one axial end 18a of the housing and having an outlet 20a at a distally opposite axial end 22a of the housing. The housing is preferably plastic and provided by a box-like member 102 having an outer peripheral flange 104 mating with flange 106 of housing end 22a and pinching gasket 82b therebetween. Gasket 82b seals pleated filter block 44 or 44a in the housing. Unlike first and third sections 84 and 92 of gasket 82 in FIG. 1, first and third sections 84b and 92b of gasket 82b in FIG. 5 extend perpendicularly relative to the noted third and fourth axial planes. Like second and fourth sections 86 and 94 of gasket 82 in FIG. 1, second and fourth sections 86b and 94b of gasket 82b in FIG. 5 extend perpendicularly to the noted first and second axial planes. Gasket 82b has first section 84b extending along the noted first axial plane along right side 78 and also preferably extending along one of the noted lateral planes preferably the noted second lateral plane along downstream ends 54. Gasket 82b has second section 86b extending along the noted third axial plane along upper bend lines 46 and also along the noted one lateral plane preferably the lateral plane along downstream ends 54. Gasket 82b has third section 92b extending along the noted second axial plane along left side 80 and preferably along the noted one lateral plane preferably the lateral plane formed at downstream ends 54. Gasket 82b has fourth section 94b extending along the noted fourth axial plane along the noted lower bend lines 48 and also preferably along the noted one lateral plane preferably the lateral plane along downstream ends 54.

Figure 6:
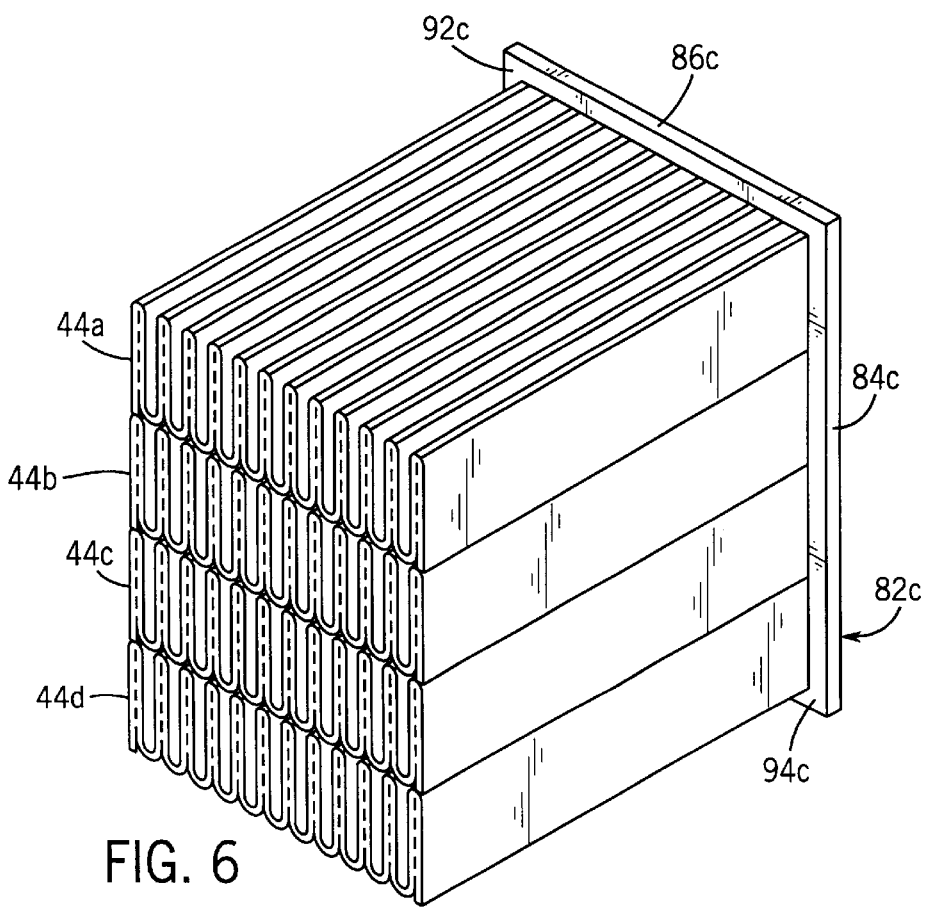
FIG. 6 is like FIG. 4 and shows another embodiment.
Figure 11:
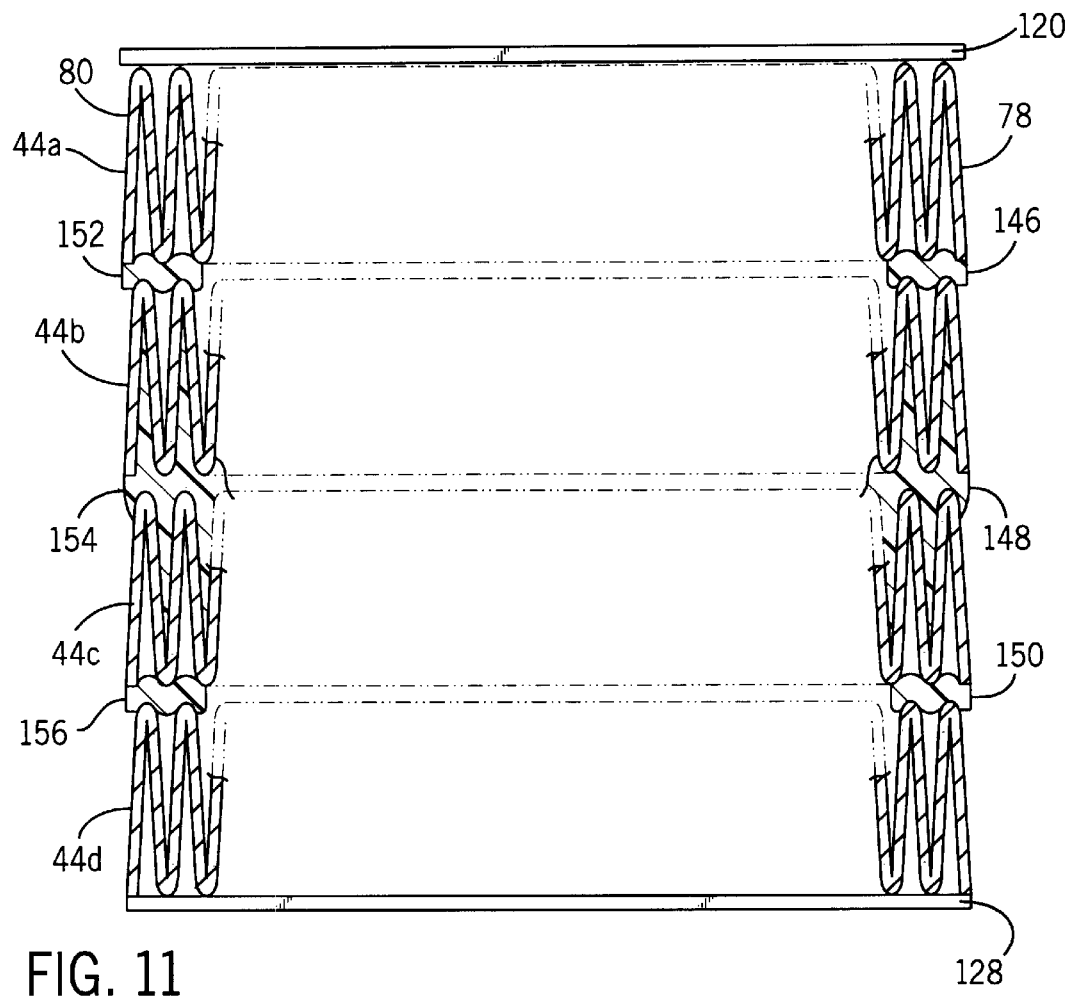
FIG. 11 is a sectional view taken along line 11—11 of FIG. 9.
Figure 12:
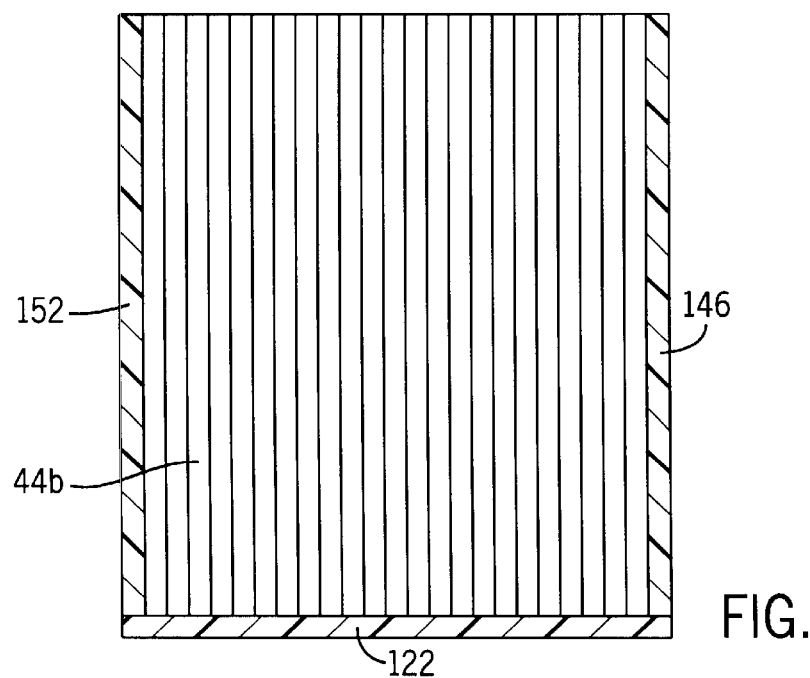
FIG. 12 is a sectional view taken along line 12—12 of FIG. 9.

FIG. 6 shows a further embodiment and uses like reference numerals from above where appropriate to facilitate understanding. Filter elements 44a, 44b, 44c, 44d are stacked on each other. Gasket 82c corresponds to gasket 82b of FIG. 5 and includes corresponding gasket sections 84c, 86c, 92c, 94c.

FIG. 7 is similar to FIG. 6 and uses like reference numerals from above where appropriate to facilitate understanding. Layers of sealing material 110, 112, etc. are between respective adjacent stacked filter elements, FIG. 8. In one embodiment, each layer 110, 112, etc. is impervious to the noted fluid to be filtered. In another embodiment, each layer 110, 112, etc. is pervious to such fluid and filters fluid flow therethrough. In the embodiment of FIGS. 7 and 8, each layer 110, 112, etc. spans the entire area between upstream ends 52 and downstream ends 54 and between right and left sides 78 and 80.

FIGS. 9–15 show another embodiment wherein the noted sealing layers of FIGS. 7 and 8 need not span the entire noted area between upstream and downstream ends 52 and 54 and right and left sides 78 and 80. In FIGS. 9–15, the noted sealing layers are provided by alternating strip layers such as 120, 122, 124, 126, 128, FIGS. 9, 10, including a first set of one or more upstream laterally extending strip layers 122, 126, etc., and a second set of one or more downstream laterally extending strip layers 120, 124, 128, etc., interdigitated with the first set of strip layers. Each strip layer 122, 126, etc. of the first set extends laterally between the right and left sides 78 and 80 at upstream end 52 and extends along the lower bend lines of the filter element thereabove and the upper bend lines of the filter element therebelow. Each strip layer 120, 124, 128, etc. of the second set extends laterally between right and left sides 78 and 80 at downstream end 54 and extends along the lower bend lines of the filter element thereabove and the upper bend lines of the filter element therebelow. A given filter element, e.g. 44b, has a strip layer 122 of the first set extending laterally along its upper bend lines at upstream end 52, and a strip layer 124 of the second set extending laterally along its lower bend lines at downstream end 54. Filter element 44b has no strip layer along its upper bend lines at downstream end 54, and has no strip layer along its lower bend lines at upstream end 52.

A first filter element such as 44a has a first strip layer 122 of the first set extending along its lower bend lines at upstream end 52, a second filter element such as 44b has a first strip layer 124 of the second set extending laterally along its lower bend lines at downstream end 54, a third filter element such as 44c has a second strip layer 126 of the first set extending along its lower bend lines at upstream end 52. The noted first and second filter elements 44a and 44b have the first strip layer 122 of the first set extending laterally therebetween at upstream end 52. The noted first and second filter elements 44a and 44b have no strip layer extending laterally therebetween at downstream end 54. The noted second and third filter elements 44b and 44c have first strip layer 124 of the second set extending laterally therebetween at downstream end 54. The noted second and third filter elements 44b and 44c have no strip layer extending laterally therebetween at upstream end 52.

Figure 13:
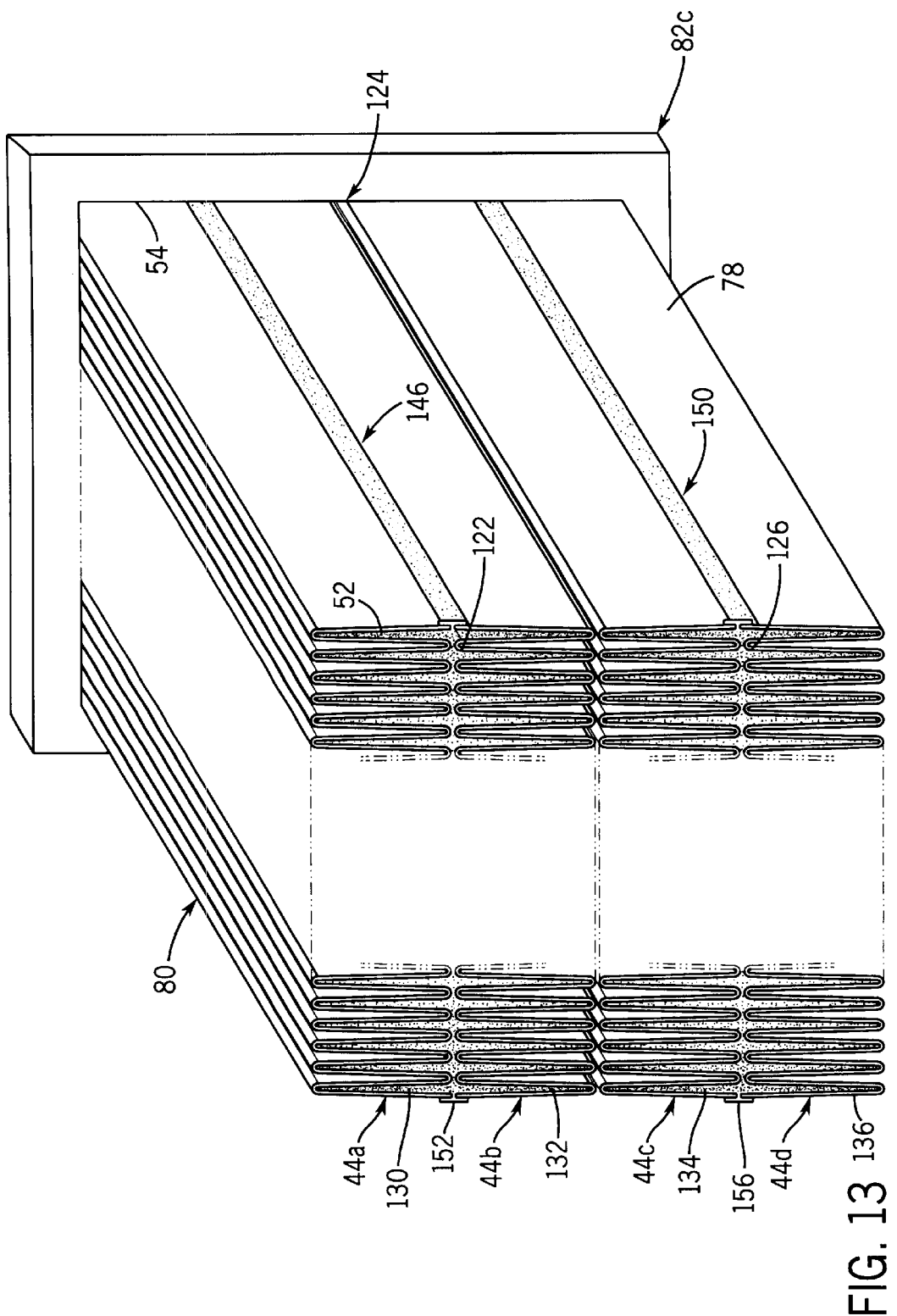
FIG. 13 is similar to FIGS. 4, 6, 7, 9, and further illustrates sealing.

As shown in FIGS. 13 and 14, the closed upstream ends of the noted second set of flow channels are closed by sealing material such as 130 at filter element 44a, 132 at filter element 44b, 134 at filter element 44c, 136 at filter element 44d. The closed downstream ends of the first set of flow channels are closed by sealing material such as 138, FIG. 15, at filter element 44a, 140 at filter element 44b, 142 at filter element 44c, 144 at filter element 44d. Lateral sealing strip 122, FIGS. 13, 14, is sealed to the sealing material 130 in the closed upstream ends of the flow channels of filter element 44a thereabove and is sealed to sealing material 132 in the closed upstream ends of the flow channels of filter element 44b therebelow. Lateral strip 122 may be adhesively bonded to sealing material 130, 132, or may be integrally formed therewith as in a hot melt application, or the like. Lateral strip 126 is sealed to sealing material 134 in the closed upstream ends of the flow channels of filter element 44c thereabove and is sealed to the closed upstream ends of the flow channels of filter element 44d therebelow. Lateral sealing strip 124, FIG. 15, is sealed to sealing material 140 in the closed downstream ends of the flow channels of filter element 44b thereabove and is sealed to sealing material 142 in the closed downstream ends of the flow channels of filter element 44c therebelow. The described sealing protects the downstream, clean areas of the filter from the upstream, dirty areas of the filter.

In FIGS. 9–15, the noted sealing layers are also provided by a right set of axially extending side edge layers 146, 148, 150, etc., FIGS. 9, 11, 12, 13, 14, and a left set of axially extending side edge layers 152, 154, 156, etc. Each side edge layer of the right set extends axially from upstream end 52 to downstream end 54 and engages the right side of the filter element thereabove and the right side of the filter element therebelow such that the right side of the filter element is sealed to the right side of the filter element thereabove and to the right side of the filter element therebelow. Each side edge layer of the left set extends axially from upstream end 52 to downstream end 54 and engages the left side of the filter element thereabove and the left side of the filter element therebelow such that the left side of the filter element is sealed to the left side of the filter element thereabove and to the left side of the filter element therebelow. Side edge layers 148 and 154 are optional because of the sealing provided by downstream lateral sealing strip layer 124. FIGS. 13 and 14 show deletion of side edge layers 148 and 154. The noted lateral strip layers and side edge layers protect downstream and clean areas of the filter from the upstream and dirty areas of the filter. The noted strip layers and edge layers are preferably provided by adhesive such as hot melt, though other types of sealing strips may be used.

It is recognized that various equivalents, alternatives and modifications are possible within the scope of the appended claims.

What is claimed is:

1. A filter comprising a housing extending along an axis and having an inlet at one axial end of said housing and having an outlet at a distally opposite axial end of said housing, a pleated filter element in said housing, said pleated filter element being pleated along a plurality of bend lines, said bend lines extending axially, said filter element having a plurality of wall segments extending in serpentine manner between said bend lines, said wall segments extending axially between upstream ends at said inlet and downstream ends at said outlet, said wall segments defining axial flow channels therebetween, said upstream ends of said wall segments being alternately sealed to each other to define a first set of flow channels having open upstream ends, and a second set of flow channels interdigitated with said first set of flow channels and having closed upstream ends, said downstream ends of said wall segments being alternately sealed to each other such that said first set of flow channels have closed downstream ends, and said second set of flow channels have open downstream ends, such that fluid to be filtered flows substantially directly axially through said filter element, through said open upstream ends of said first set of flow channels then through said wall segments then through said open downstream ends of said second set of flow channels, and a gasket sealing said filter element to said housing, wherein said filter element has laterally distally opposite first and second axially extending sides, said first side defining a first axially extending plane, said second side defining a second axially extending plane, said second axial plane being parallel to and spaced from said first axial plane, said upstream ends of said wall segments define a first laterally extending plane, said downstream ends of said wall segments define a second laterally extending plane, said second lateral plane being parallel to and spaced from said first lateral plane, said first and second lateral planes being perpendicular to said first and second axial planes, said bend lines comprise a first set of coplanar bend lines defining a third axially extending plane, and a second set of coplanar bend lines defining a fourth axially extending plane, said fourth axial plane being parallel to and spaced from said third axial plane, said third and fourth axial planes being perpendicular to said first and second axial planes and perpendicular to said first and second lateral planes, said gasket has a first section extending along both said first axial plane and one of said lateral planes, a second section extending along both said third axial plane and said one lateral plane, a third section extending along both said second axial plane and said one lateral plane, and a fourth section extending along both said fourth axial plane and said one lateral plane.

2. A filter comprising a housing extending along an axis and having an inlet at one axial end of said housing and having an outlet at a distally opposite axial end of said housing, a pleated filter element in said housing, said pleated filter element being pleated along a plurality of bend lines, said bend lines extending axially, said filter element having a plurality of wall segments extending in serpentine manner between said bend lines, said wall segments extending axially between upstream ends at said inlet and downstream ends at said outlet, said wall segments defining axial flow channels therebetween, said upstream ends of said wall segments being alternately sealed to each other to define a first set of flow channels having open upstream ends, and a second set of flow channels interdigitated with said first set of flow channels and having closed upstream ends, said downstream ends of said wall segments being alternately sealed to each other such that said first set of flow channels have closed downstream ends, and said second set of flow channels have open downstream ends, such that fluid to be filtered flows substantially directly axially through said filter element, through said open upstream ends of said first set of flow channels then through said wall segments then through said open downstream ends of said second set of flow channels, and a gasket sealing said filter element to said housing, and comprising a plurality of filter elements stacked on each other, each filter element having wall segments with upstream ends and downstream ends, said upstream ends of said wall segments being coplanar along a first laterally extending plane, said downstream ends of said wall segments being coplanar along a second laterally extending plane, said second lateral plane being parallel to and spaced from said first lateral plane, each filter element having laterally distally opposite first and second sides, said first sides of said filter elements being coplanar along a first axially extending plane, said second sides of said filter elements being coplanar along a second axially extending plane, said second axial plane being parallel to and spaced from said first axial plane, said first and second axial planes being perpendicular to said first and second lateral planes, said gasket has a first section extending along said first axial plane, a second section extending along said second lateral plane, a third section extending along said second axial plane, and a fourth section extending along said first lateral plane.

3. The invention according to claim 2 wherein said first and third sections of said gasket extend obliquely relative to said axis.

4. The invention according to claim 3 wherein said second and fourth sections of said gasket extend perpendicular to said first and second axial planes.

5. A filter comprising a housing extending along an axis and having an inlet at one axial end of said housing and having an outlet at a distally opposite axial end of said housing, a pleated filter element in said housing, said pleated filter element being pleated along a plurality of bend lines, said bend lines extending axially, said filter element having a plurality of wall segments extending in serpentine manner between said bend lines, said wall segments extending axially between upstream ends at said inlet and downstream ends at said outlet, said wall segments defining axial flow channels therebetween, said upstream ends of said wall segments being alternately sealed to each other to define a first set of flow channels having open upstream ends, and a second set of flow channels interdigitated with said first set of flow channels and having closed upstream ends, said downstream ends of said wall segments being alternately sealed to each other such that said first set of flow channels have closed downstream ends, and said second set of flow channels have open downstream ends, such that fluid to be filtered flows substantially directly axially through said filter element, through said open upstream ends of said first set of flow channels then through said wall segments then through said open downstream ends of said second set of flow channels, and a gasket sealing said filter element to said housing, and comprising a plurality of filter elements stacked on each other, each filter element having laterally distally opposite first and second sides, said first sides of said filter elements being coplanar along a first axially extending plane, said second sides of said filter elements being coplanar along a second axially extending plane, said second axial plane being parallel to and spaced from said first axial plane, each filter element having an upper set of coplanar bend lines, and a lower set of coplanar bend lines, the upper set of coplanar bend lines of the top filter element defining a third axially extending plane, the lower set of coplanar bend lines of the bottom filter element defining a fourth axially extending plane, said fourth axial plane being parallel to and spaced from said third axial plane, said third and fourth axial planes being perpendicular to said first and second axial planes, said gasket has a first section extending along said first axial plane, a second section extending along said third axial plane, a third section extending along said second axial plane, and a fourth section extending along said fourth axial plane.

6. The invention according to claim 5 wherein said first and third sections of said gasket extend obliquely relative to said axis.

7. The invention according to claim 6 wherein said second and fourth sections of said gasket extend perpendicularly to said first and second axial planes.

8. The invention according to claim 5 wherein said first and second sections of said gasket extend perpendicularly to said third and fourth axial planes.

9. The invention according to claim 8 wherein said second and fourth sections of said gasket extend perpendicularly to said first and second axial planes.

10. A filter comprising a housing extending along an axis and having an inlet at one axial end of said housing and having an outlet at a distally opposite axial end of said housing, a pleated filter element in said housing, said pleated filter element being pleated along a plurality of bend lines, said bend lines extending axially, said filter element having a plurality of wall segments extending in serpentine manner between said bend lines, said wall segments extending axially between upstream ends at said inlet and downstream ends at said outlet, said wall segments defining axial flow channels therebetween, said upstream ends of said wall segments being alternately sealed to each other to define a first set of flow channels having open upstream ends, and a second set of flow channels interdigitated with said first set of flow channels and having closed upstream ends, said downstream ends of said wall segments being alternately sealed to each other such that said first set of flow channels have closed downstream ends, and said second set of flow channels have open downstream ends, such that fluid to be filtered flows substantially directly axially through said filter element, through said open upstream ends of said first set of flow channels then through said wall segments then through said open downstream ends of said second set of flow channels, and a gasket sealing said filter element to said housing, and comprising a plurality of filter elements stacked on each other, each filter element having laterally distally opposite first and second sides, said first sides of said filter elements being coplanar along a first axially extending plane, said second sides of said filter elements being coplanar along a second axially extending plane, said second axial plane being parallel to and spaced from said first axial plane, each filter element having a plurality of wall segments having upstream ends and downstream ends, said upstream ends of said wall segments define a first laterally extending plane, said downstream ends of said wall segments defme a second laterally extending plane, said second lateral plane being parallel to and spaced from said first lateral plane, said first and second lateral planes being perpendicular to said first and second axial planes, each filter element having an upper set of coplanar bend lines, and a lower set of coplanar bend lines, one of the upper set of bend lines of the top filter element and the lower set of bend lines of the bottom filter element defining a third axially extending plane, the other of the upper set of bend lines of the top filer element and the lower set of bend lines of the bottom filter element defining a fourth axially extending plane, said fourth axial plane being parallel to and spaced from said third axial plane, third and fourth axial planes being perpendicular to said first and second axial planes and perpendicular to said first and second lateral planes, said gasket has a first section extending along said first axial plane, a second section extending along both said second lateral plane and said third axial plane, a third section extending along said second axial plane, and a fourth section extending along both said first lateral plane and said fourth axial plane.

11. The invention according to claim 10 wherein said first and third sections of said gasket extend obliquely relative to said axis.

12. The invention according to claim 11 wherein said second and fourth sections of said gasket extend perpendicularly to said first and second axial planes.

13. A filter comprising a housing extending along an axis and having an inlet at one axial end of said housing and having an outlet at a distally opposite axial end of said housing, a pleated filter element in said housing, said pleated filter element being pleated along a plurality of bend lines, said bend lines extending axially, said filter element having a plurality of wall segments extending in serpentine manner between said bend lines, said wall segments extending axially between upstream ends at said inlet and downstream ends at said outlet, said wall segments defining axial flow channels therebetween, said upstream ends of said wall segments being alternately sealed to each other to define a first set of flow channels having open upstream ends, and a second set of flow channels interdigitated with said- first set of flow channels and having closed upstream ends, said downstream ends of said wall segments being alternately sealed to each other such that said first set of flow channels have closed downstream ends, and said second set of flow channels have open downstream ends, such that fluid to be filtered flows substantially directly axially through said filter element, through said open upstream ends of said first set of flow channels then through said wall segments then through said open downstream ends of said second set of flow channels, and a gasket sealing said filter element to said housing, and comprising a plurality of filter elements stacked on each other, each filter element having wall segments with upstream ends and downstream ends, said upstream ends of said wall segments being coplanar along a first laterally extending plane, said downstream ends of said wall segments being coplanar along a second laterally extending plane, said second lateral plane being parallel to and spaced from said first lateral plane, each filter element having laterally distally opposite first and second sides, said first sides of said filter elements being coplanar along a first axially extending plane, said second sides of said filter elements coplanar along a second axially extending plane, said second axial plane being parallel to and spaced from said first axial plane, said first and second axial planes being perpendicular to said first and second lateral planes, said gasket has a first section extending along both said first axial plane and one of said lateral planes, a second section extending along both said third axial plane and said one lateral plane, a third section extending along both said second axial plane and said one lateral plane, and a fourth section extending along both said fourth axial plane and said one lateral plane.

14. A pleated filter block extending along an axis and having right and left axially extending sides, and first and second sets of axially extending bend lines and one or more rows of wall segments folded in serpentine manner therebetween, one of said first and second sets being an upper set of bend lines, the other of said first and second sets being a lower set of bend lines, said wall segments extending axially between upstream ends and downstream ends, said wall segments defining axial flow channels therebetween, said upstream ends of said wall segments being alternately sealed to each other to define a first set of flow channels having open upstream ends, and a second set of flow channels interdigitated with said first set of flow channels and having closed upstream ends, said downstream ends of said wall segments being alternately sealed to each other such that said first set of flow channels have closed downstream ends, and said second set of flow channels have open downstream ends, such that fluid to be filtered flows substantially directly axially through said filter block, through said open upstream ends of said first set of flow channels then through said wall segments then through said open downstream ends of said second set of flow channels, and a gasket having a first section extending along said right side, a second section extending along at least one of a) said downstream ends of said wall segments and b) said first set of bend lines, a third section extending along said left side, and a fourth section extending along at least one of a) said upstream ends of said wall segments and b) said second set of bend lines, wherein said filter block comprises a plurality of filter elements stacked on each other, each filter element having upper and lower bend lines, the upper bend lines of the top filter element providing said upper set of bend lines, the lower bend lines of the bottom filter element providing said lower set of bend lines.

15. The invention according to claim 14 comprising at least one layer of sealing material between respective adjacent stacked filter elements.

16. The invention according to claim 15 wherein said layer is impervious to said fluid.

17. The invention according to claim 15 wherein said layer is pervious to said fluid and filters fluid flow therethrough.

18. The invention according to claim 15 wherein said layer spans the entire area between said upstream and downstream ends and between said right and left sides.

19. The invention according to claim 15 comprising a plurality of said layers comprising alternating strip layers comprising a first set of one or more upstream laterally extending strip layers and a second set of one or more downstream laterally extending strip layers interdigitated with said first set of strip layers, each said strip layer of said first set extending laterally between said right and left sides at said upstream end and extending along the lower bend lines of the filter element thereabove and the upper bend lines of the filter element therebelow, each said strip layer of said second set extending laterally between said right and left sides at said downstream end and extending along the lower bend lines of the filter element thereabove and the upper bend lines of the filter element therebelow, such that a given said filter element has a strip layer of said first set extending laterally along its upper bend lines at said upstream end, and a strip layer of said second set extending laterally along its lower bend lines at said downstream end, said given filter element having no strip layer along its upper bend lines at said downstream end, said given filter element having no strip layer along its lower bend lines at said upstream end.

20. The invention according to claim 19 wherein a first of said filter elements has a first strip layer of said first set extending along its lower bend lines at said upstream end, a second filter element has a first strip layer of said second set extending laterally along its lower bend lines at said downstream end, a third filter element has a second strip layer of said first set extending laterally along its lower bend lines at said upstream end, said first and second filter elements having said first strip layer of said first set extending laterally therebetween at said upstream end, said first and second filter elements having no strip layer extending laterally therebetween at said downstream end, second and third filter elements having said first strip layer of said second set extending laterally therebetween at said downstream end, said second and third filter elements having no strip layer extending laterally therebetween at said upstream end.

21. The invention according to claim 19 wherein said closed upstream ends of said second set of flow channels are closed by sealing material between respective said wall segments, and wherein a given said strip layer of said first set is sealed to said sealing material in said closed upstream ends of said second set of flow channels of the filter element thereabove and is sealed to said sealing material in said closed upstream ends of said second set of flow channels of the filter element therebelow, and wherein the closed downstream ends of said first set of flow channels are closed by sealing material between respective said wall segments, and wherein a given said strip layer of said second set is sealed to said sealing material in said closed downstream ends of said first set of flow channels of the filter element thereabove and is sealed to said sealing material in said closed downstream ends of said first set of flow channels of the filter element therebelow.

22. The invention according to claim 19 wherein said plurality of layers further comprise right and left sets of axially extending side edge layers, each said side edge layer of said right set extending axially from said upstream end to said downstream end and engaging the right side of the filter element thereabove and the right side of the filter element therebelow such that the right side of a given said filter element is sealed to the right side of at least one of the filter element thereabove and the filter element therebelow, each said side edge layer of said left set extending axially from said upstream end to said downstream end and engaging the left side of the filter element thereabove and the left side of the filter element therebelow such that the left side of a given said filter element is sealed to the left side of at least one of the filter element thereabove and the filter element therebelow.

23. The invention according to claims 19 wherein a first of said filter elements has a first strip layer of said first set extending along its lower bend lines at said upstream end, a second filter element has a first strip layer of said second set extending laterally along its lower bend lines at said downstream end, a third filter element has a second strip layer of said first set extending laterally along its lower bend lines at said upstream end, said first and second filter elements having said first strip layer of said first set extending laterally therebetween at said upstream end, said first and second filter elements having no strip layer extending laterally therebetween at said downstream end, said second and third filter elements having said first strip layer of said second set extending laterally therebetween at said downstream end, said second and third filter elements having no strip layer extending laterally therebetween at said upstream end, and wherein said closed upstream ends of said second set of flow channels are closed by sealing material between respective said wall segments, and wherein a given said strip layer of said first set is sealed to said sealing material in said closed upstream ends of said second set of flow channels of the filter element thereabove and is sealed to said sealing material in said closed upstream ends of said second set of flow channels of the filter element therebelow, and wherein the closed downstream ends of said first set of flow channels are closed by sealing material between respective said wall segments, and wherein a given said strip layer of said second set is sealed to said sealing material in said closed downstream ends of said first set of flow channels of the filter element thereabove and is sealed to said sealing material in said closed downstream ends of said first set of flow channels of the filter element therebelow, and wherein said plurality of layers further comprise right and left sets of axially extending side edge layers, each said side edge layer of said right set extending axially from said upstream end to said downstream end and engaging the right side of the filter element thereabove and the right side of the filter element therebelow such that the right side of a given said filter element is sealed to the right side of at least one of the filter element thereabove and the filter element therebelow, each said side edge layer of said left set extending axially from said upstream end to said downstream end and engaging the left side of the filter element thereabove and the left side of the filter element therebelow such that the left side of a given said filter element is sealed to the left side of at least one of the filter element thereabove and the filter element therebelow.

24. The invention according to claim 23 wherein said right set of axially extending side edge layers includes a side edge layer between each filter element, there being no unsealed gaps between filter elements along the right side of said filter block, and wherein said left set of axially extending side edge layers includes a side edge layer between each filter element, there being no unsealed gaps between filter elements along the left side of said filter block.

25. The invention according to claim 23 wherein said second and third filter elements have no side edge layer therebetween along said right side and have no side edge layer therebetween along said left side.

* * * * *